United States Patent [19]

Terada

[11] 3,789,138

[45] Jan. 29, 1974

[54] DEVICE FOR GAINING RANDOM ACCESS TO VIDEO SIGNAL INFORMATION FOR USE IN VIDEO TAPE RECORDERS

[75] Inventor: Toshimichi Terada, Hachioji-shi, Japan

[73] Assignee: Hitachi, Ltd., Tokyo, Japan

[22] Filed: June 18, 1971

[21] Appl. No.: 154,562

[30] Foreign Application Priority Data

June 23, 1970 Japan ................................ 45-54626

[52] U.S. Cl.... 178/6.6 A, 178/6.6 FS, 179/100.2 S, 340/174.1 C

[51] Int. Cl. .............................................. H04n 5/78

[58] Field of Search ............... 179/100.2 B, 100.2 S; 178/6.6 A, 6.6 FS; 340/174.1 C

[56] References Cited

UNITED STATES PATENTS

| | | | |
|---|---|---|---|
| 3,219,999 | 11/1965 | Smith | 340/174.1 J |
| 3,705,953 | 12/1972 | Lemelson | 178/6.6 A |
| 3,571,528 | 3/1971 | Smith | 179/100.2 B |
| 3,156,785 | 11/1964 | Hummel | 179/100.2 B |
| 3,180,930 | 4/1965 | Bounsall | 179/100.2 B |
| 3,647,951 | 3/1972 | Rose | 179/100.2 B |

*Primary Examiner*—James W. Moffitt
*Attorney, Agent, or Firm*—Craig, Antonelli and Hill

[57] ABSTRACT

In a video tape recorder for recording video signal information of television scenes, pictures and various documents frame by frame on one or more tracks on a magnetic tape and selectively reproducing a desired video signal, a means for gaining random access to the desired video signal. The video signal information is recorded in blocks each consisting of many tracks noted above and each being spaced from another to define a blank portion without any information recorded between adjacent blocks. In addition to the video signal information, block identifying signals are recorded on the magnetic tape. For the reproduction of a desired static picture, random access to the desired frame is made by first running the magnetic tape by a fast feed or fast rewind drive until a block including the desired track or tracks is detected from the block identifying signals and then by feeding the tape either intermittently or continuously at a low speed until the position of the track of the desired frame is reached.

5 Claims, 6 Drawing Figures

INVENTOR

TOSHIMICHI TERADA

BY Craig, Antonelli & Hill

ATTORNEYS

INVENTOR
TOSHIMICHI TERADA
BY Craig, Antonelli & Hill
ATTORNEYS

INVENTOR

TOSHIMICHI TERADA

BY Craig, Antonelli & Hill
ATTORNEYS

DEVICE FOR GAINING RANDOM ACCESS TO VIDEO SIGNAL INFORMATION FOR USE IN VIDEO TAPE RECORDERS

BACKGROUND OF THE INVENTION

1. Field of the Invention

This invention relates to means for gaining access to video signals filed as a number of frames, such as those used in teaching machines, by using a helical scan type video tape recorder.

2. Description of the Prior Art

As one type of the prior-art random access means, there is the so-called "video file system". This is a large scale system, using a video tape recorder of the type used for broadcasting purposes and magnetic disks. In this system, a magnetic tape carrying video signal information is driven at a high speed to search for the location of a desired video signal, and when the required location is approached the tape speed is switched to a moderate constant speed and the location of the desired signal is identified from the address signals previously recorded on the tape. The video signal thus found is transferred to a magnetic disk serving as a buffer memory, from which the desired picture is continuously displayed on a television screen. This system has the disadvantage that it requires buffer memories. Also, since a video tape recorder for broadcasting purposes is used, the scale of the system inevitably tends to be large.

As another type of the prior-art random access means, there is a document retrieval system. This system uses a helical scan type video tape recorder and does not require any buffer memory. However, in this system the tape is suddenly stopped when the location of the desired video signal is detected, so that a special magnetic head and special tape drive mechanism are required.

SUMMARY OF THE INVENTION

Accordingly, an object of the invention is to provide device for quickly selecting a desired one of many static pictures recorded using a magnetic recording and reproducing system for the still reproduction of the desired picture.

Another object of the invention is to provide a simplified construction for the device for selecting desired pictures recorded in a magnetic recording and reproducing system.

A further object of the invention is to provide a device to effectively separate control signals indicating the position of picture frames from the video signal information recorded by the magnetic recording and reproducing system.

A still further object of the invention is to provide a means for reproducing a desired picture by holding the magnetic tape in the recording and reproducing system stationary in a specified position and without using any buffer memory.

According to the present invention, each frame (a single picture) of information, for instance video signal information for television broadcasting, is recorded as one or several tracks on the magnetic tape used in the usual helical scan type video tape recorder. The entire tape is divided into a plurality of blocks each consisting of many of the afore-said recording tracks carrying video signal information. The individual blocks are spaced to define a constant length of blank space free from video signal information recorded between adjacent blocks, and block identifying signals are recorded in the individual blank spaces. If necessary, address signals or track identifying signals corresponding to the individual tracks in each block are also recorded.

The random access device according to the invention is provided with a head to record and read out video signal information and a head to record and read out signals indicating the position of the video signal information recorded (hereinafter referred to as addresses). These heads may be replaced with a single common head. According to the invention, a control circuit is provided to control the driving of the magnetic tape (such as normal feeding, fast feeding, fast rewinding, stopping, intermittent feeding and low speed feeding) in accordance with the address output. The location of the video signal recorded on the tape and desired to be read out (to be reproduced) is specified to the control circuit. Then, the control circuit controls the movement of the tape first by giving instructions to fast feed or fast rewind the tape until the block including the track of the specified picture is identified, and then upon detection of the address of the specified block it switches the tape drive into intermittent feed or low-speed continuous feed. Then, upon detection of the specified track of the desired video signal within the block of the detected address, it automatically stops the movement of the tape.

The above and other objects, features and advantages of the invention will become more apparent from the following description having reference to the accompanying drawing.

DESCRIPTION OF THE PREFERRED EMBODIMENTS

Figure 1:
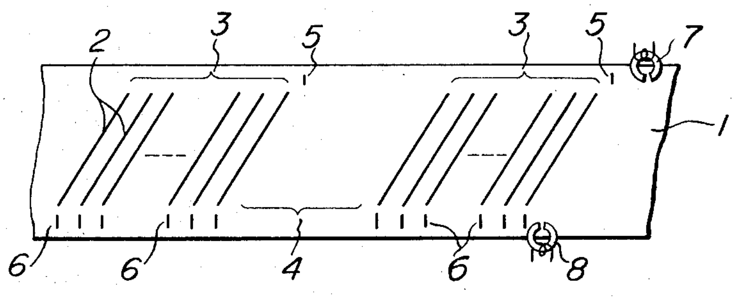
FIGS. 1 to 3 show the state of information recorded in a magnetic tape in respective embodiments of the invention.

FIG. 1 shows the state of information recorded in a magnetic tape in one embodiment of the invention. In the Figure, reference numeral 1 designates a magnetic tape having recording tracks 2, which represent video information recorded. The recording and reproduction of the video signal may be done by a method similar to that carried out with the well-known helical scan type video tape recorder, and will not be described in detail.

As is well known in the art, with a helical scan type video tape recorder the recording and reproduction of the video signal for one field are done as each recording track 2 in the magnetic tape 1 is scanned in 1/60 second by the rotary head assembly, with two fields constituting one frame. It is also possible to record video information per one frame in a single track, so that one recording track corresponds to each frame, by scanning each recording track twice in 1/30 second. This is achieved by increasing the record density and reducing the rotating speed of the rotary head assembly. In this case, it is possible to obtain still reproduction of one frame by holding the magnetic tape stationary and causing the rotary head assembly to repeatedly scan the corresponding track.

Usually, with a video tape recorder video information corresponding to moving scenes are continuously recorded on successive tracks and reproduced. According to the invention, video signals representing entirely different scenes may be recorded as the individual recording tracks and the desired picture may be reproduced by still reproduction in a random access method. Also, according to the invention the recording tracks are grouped into blocks 3 (for instance, each of 200 tracks) uniformly spaced as indicated at 4 on the magnetic tape 1.

To provide for the random access to a desired block, the individual blocks in the arrangement of FIG. 1 are assigned with respective block identifying signals recorded adjacent the individual blocks as indicated at 5. The magnetic tape of FIG. 1 also carries track identifying signals, which correspond to respective tracks, that is, respective picture frames, within each block and are recorded as separate control tracks as indicated at 6. To hold the magnetic tape stationary at a desired position for reproducing a desired picture, the magnetic tape is first driven by the fast feed drive or fast rewind drive until the leading end of the block including the desired track comes to face a video signal read-out magnetic head (not shown). As soon as the leading end of the afore-said block reaches the read-out magnetic head, a magnetic head 7 to detect the block identifying signal 5 is adapted to provide a detection signal to actuate a separately provided control circuit, which then stops the fast feeding or fast rewinding of the magnetic tape and starts an appropriate intermittent feed drive to intermittently feed the magnetic tape.

When a magnetic head 8 to detect the track identifying signal 6 detects the desired track in the course of the intermittent feed of the magnetic tape, it provides a detection output to actuate a separately provided control circuit, which then stops the intermittent feeding of the magnetic tape upon reaching of the desired track that is externally specified. In this manner, the magnetic tape is held stationary at the specified position for a still reproduction of the desired picture.

It will be seen that by the above method it it possible to avoid suddenly stopping the tape at the intended position and the tape may be driven very smoothly. Also, no special construction is required for the detection head. Further, the increase of the access time compared to the above-noted conventional system is very slight because the access to the block is achieved by fast feed or fast rewind drive.

Figure 2:
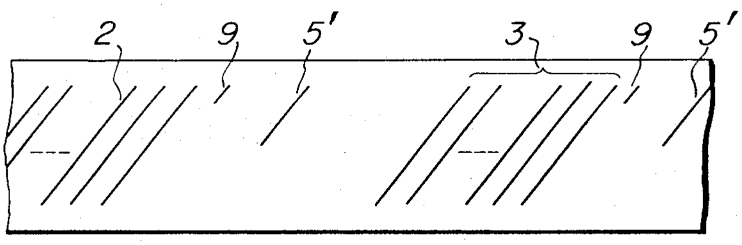
Figure 3:
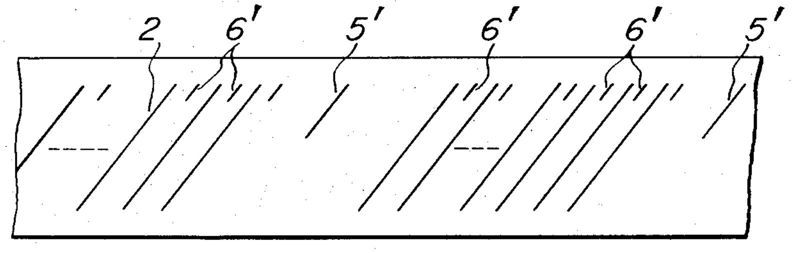

FIGS. 2 and 3 show examples of the arrangement of the block identifying signals and track identifying signals recorded in the magnetic tape other than the arrangement of FIG. 1.

In the example of FIG. 2, the track identifying signals for each block are recorded not as separate control tracks like those in case of FIG. 1 but as a track similar to the video signal recording tracks 2 and arranged ahead of each block, as indicated at 5′, such that the number of intermittent feeds may be counted from the number of tracks from the first track detected from a signal recorded in front of each block till the one facing a rotary head. The address of the desired track corresponds to the count, so that the intermittent feed may be stopped at the desired position.

In the example of FIG. 3, in lieu of recording signal 6 indicating the first track in each block as in the example of FIG. 2, track identifying codes 6′ corresponding to the track identifying signals 6 in the example of FIG. 1 are recorded in an interlaced relation to the individual tracks 2, so that the desired track may be identified as the rotary head detects the corresponding track identifying code.

As shown in the above examples, the desired track may be detected either by detecting a specific track identifying signal, by counting the corresponding number of intermittent feeds or by detecting a specific track identifying code as in the example of FIG. 3.

Figure 4:
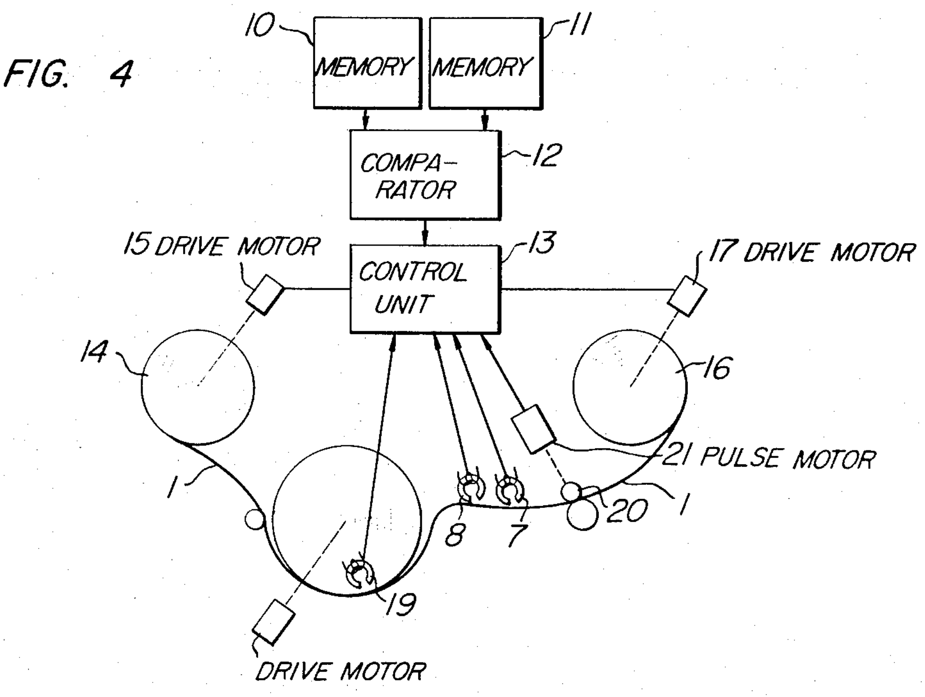
FIG. 4 is a schematic representation of one embodiment of the invention.
Figure 5:
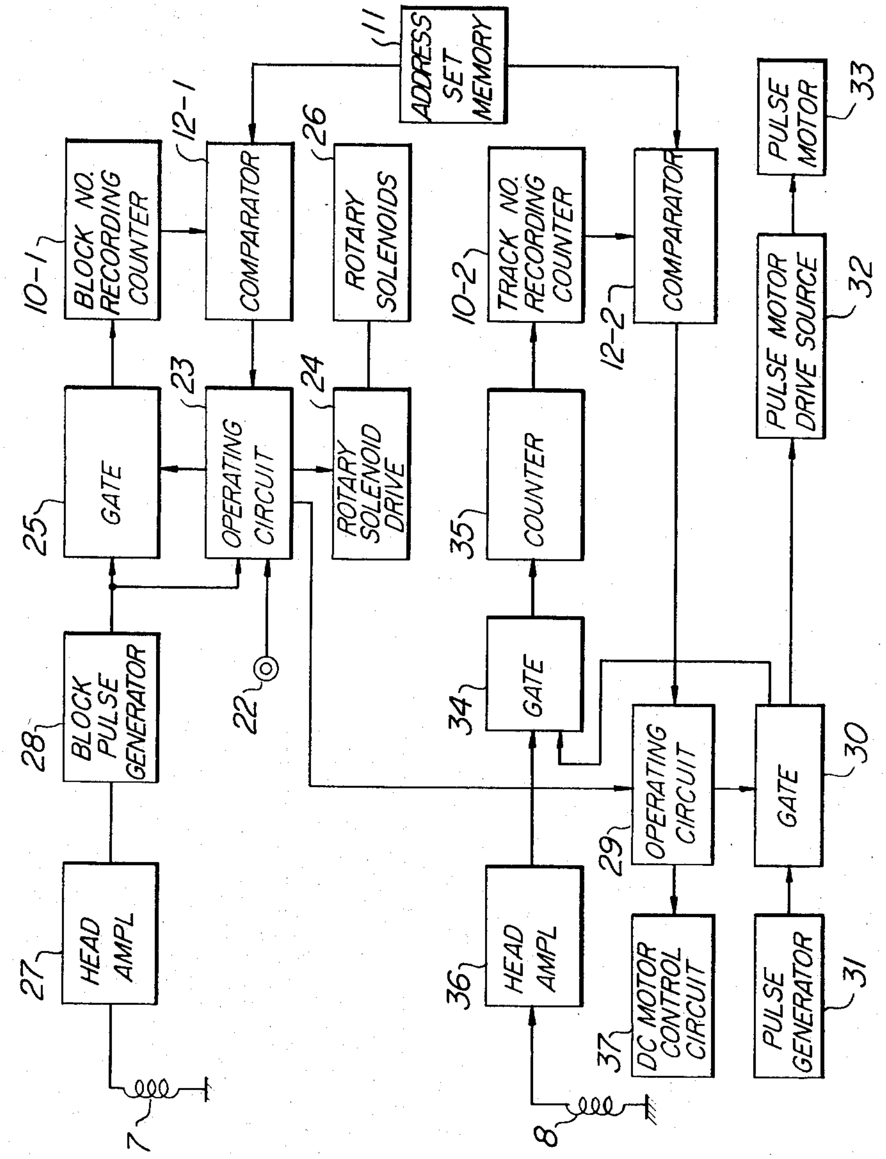
FIG. 5 is a block diagram showing part of the embodiment of FIG. 4.

FIG. 4 shows one embodiment of the invention, and FIG. 5 shows the control circuit in the embodiment of FIG. 4.

Referring to FIG. 4, reference numeral 10 designates a memory (register) to which the block address and track address of a desired track are given. Numeral 11 designates a memory (shift register) to register the prevailing block address and track address. A comparator 12 compares the contents of the memories 10 and 11. A control unit 13 gives fast feed or fast rewind instructions to a drive motor 15 to drive a supply reel 14 or to a drive motor 17 to drive a take-up reel 16 according to the results of comparison given from the comparator 12. Numeral 7 designates a magnetic head to detect the block identifying signal described above in connection with FIG. 1. Numeral 8 designates a magnetic head to detect track identifying signals to be described hereinafter in connection with FIG. 6. Numeral 19 designates a magnetic head for converting the video information recorded as track 2 in the magnetic tape 1 into a corresponding electric signal. Numeral 20 designates a tape drive capstan, which is driven from a stepping motor 21 for intermittently feeding the magnetic tape.

Figure 6:
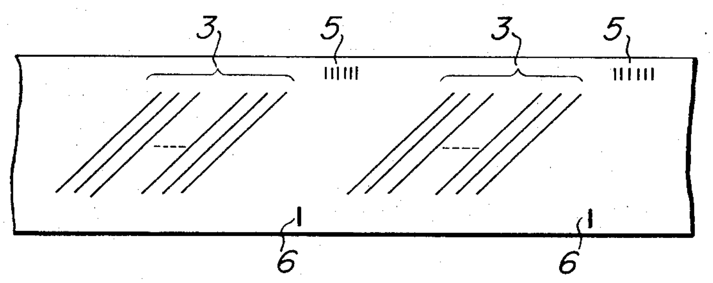
FIG. 6 shows the state of information recorded in a magnetic tape in the embodiment of FIG. 5.

FIG. 6 shows the magnetic tape 1 used in this embodiment. It carries video information in blocks 3, block identifying signals 5 and leading track position signals 6. Each block is provided with the block identifying signal 5 in the form of a plurality (for instance 4 to 10) pulses arranged in the direction of progress of the tape. As the leading track position signal, a fraction of a continuous signal at a frequency of about 1 kHz is recorded.

The operation of selectively reproducing a desired picture from the recorded picture signals of a number of scenes will now be described by having reference to FIGS. 4 and 6 and the control circuit in the block diagram of FIG. 5.

The address (consisting of a block number and a track number) of a track corresponding to a desired picture frame is preset in an address set memory 11. Then, when a start button 22 is depressed, a comparator 12-1 compares the address set in the address set memory 11 with the signal of a block number recording counter 10-1 giving the prevailing block number. The output signal of the comparator 12-1 is fed to an operating circuit 23, which determines which one of the rotary solenoids for the fast feeding and fast rewinding of the tape and for the stopping of the tape upon detection of the specified block is energized according to the result of comparison given from the comparator 12-1. The operating circuit 23 actually feeds a rotary solenoid drive 24 to drive the corresponding one of the rotary solenoids 26.

With the movement of the tape being fast fed or fast rewound, the magnetic head 7 to detect the block identifying signal 5 detects a signal corresponding to the prevailing block, which is amplified by a head amplifier 27, whose output is in turn fed through a block pulse generator 28 and the gate 25 to provide a corresponding signal suited to the operation of the block number recording counter 10–1. Since the speed of the tape being fast fed or fast rewound is not constant, in this embodiment a number of pulses arranged in the direction of progress of the tape are provided as the block identifying signal 5 in the tape 1 as shown in FIG. 6, so that a single block number pulse may be provided when a predetermined number of pulses are detected within a predetermined time interval. This is made so for the purpose of preventing malfunctioning of the system due to the other wise possible dropping out of the block identifying signal.

As the specified block reaches the correct position, the tape is stopped, whereupon the operating circuit 23 provides a pulse signal to another operating circuit 29, which thereupon puts its output signal to a gate 30 to open the same. As a result, a pulse signal from a pulse generator 31 is passed through the gate 30 to a pulse motor drive source 32, thus starting the intermittent operation of a pulse motor 33, that is, starting the intermittent feeding of the tape.

Upon starting of the intermittent tape feed, the magnetic head 8 detects a corresponding leading track position signal, whereupon a gate 34 is opened to permit the pulse signal from the pulse generator 31 to a counter 35. The counter 35 produces a single pulse every time it has counted a number of input pulses required for the tape 1 to move a distance corresponding to one track pitch, and a track number recording counter 10–2 counts the output pulses of the counter 35. A comparator 12–2 compares the output signal of the track number recording counter 10–2 with the specified track number given to the address set memory 11. The comparator 12–2 controls the operating circuit 29 in the similar manner as the comparator 12–1; when the number of pulses counted by the track number recording counter 10–2 coincides with the track number preset in the address set memory 11, the gate 30 is closed by an instruction from the operating circuit 29, thus stopping the pulse motor 33.

Numeral 36 designates a head amplifier similar to the head amplifier 27. Numeral 37 designates a d-c motor control circuit to provide a back tension to the tape only when the tape is held stationary at the desired position for the reproduction of a static picture.

If it is necessary to displace the tape from a position corresponding to one track back to a position corresponding to a preceding track in the same block, the tape is first driven by the rewind drive to the position corresponding to the first track in the same block and then access is made to the desired track within the same block.

When the tape is held stationary at the desired position in the above manner, the rotary head assembly is caused to repeatedly read out information from the specified video information recording track to reproduce the desired static picture, as has been described earlier. The static picture reproducing section may have a well-known construction, and will not be described in detail.

Although a preferred embodiment of the invention has been described in the foregoing, various modification of the above embodiment are possible. For example, in case of the arrangement of FIG. 3 including track identifying codes 6' recorded in an interlaced relation to or on the individual ones of the tracks in each block, after detection of the specified block the tape may be fed not intermittently but continuously at a low speed and may be stopped at a position corresponding to the specified track by comparing the number of the counted track identifying codes 6' and the specified track number.

Also, with the video signals and address signals recorded as in the arrangements of FIGS. 1 to 3, it is readily possible to design appropriate circuit device.

Further, although the foregoing description is concerned with the case where a single track accommodates video signal for one frame, the still reproduction of still pictures is also possible where a plurality of tracks constitute one frame by providing the same number of reproducing heads as the number of tracks in one frame in a staggered manner so that the individual heads scan the respective tracks.

Furthermore, in the foregoing embodiment the magnetic heads have been assumed to be of flux change detection type, flux detection elements such as Hall elements and magnetic reluctance effect elements may also be used for the magnetic heads. These elements can detect the address signals even when the tape is stationary and may be used as means to detect the track identifying signals during the intermittent feed of the tape.

In the preceding embodiment, for the still reproduction of a static picture the same track is scanned a number of times by the rotary head assembly. Where the same track is used many times tending to the deterioration of the video signal due to wear of the track and in such case as when a great deal of picture information is to be transmitted on many channels as in information searching, the video signal for one frame obtained in the above manner may be transferred to a separate buffer memory for repeated reproduction. By so doing, it is possible for the rotary head assembly to scan one video signal recording track only once or several times.

Although the foregoing description has mainly concerned with playback, in the recording process desired video signal for one frame may be recorded in synchronism with the rotation of the rotary head assembly by previously recording the block identifying signal and track identifying signal on the magnetic tape by a suitable method. By so doing, it is possible to gain access to a desired part on the tape on which the video signal is to be recorded in the same manner as has been described eariler in connection with the reproduction. Alternatively, it is possible to first record desired video signals and then appropriately record block identifying and track identifying signals.

I claim:

1. A device for gaining random access to video signal information for use with a helical scan type video tape recorder utilizing a magnetic tape which carries video signal information of a large number of picture frames, wherein the information of each frame is recorded as one or two recording tracks on said magnetic tape, all of said recording tracks being divided into a plurality of blocks each including a number of said recording tracks, and the positions of the leading ends of said blocks being detectable by block address signals recorded at the leading parts of said blocks and said frames being detectable by frame address signals recorded at the position of each frame, respectively, said device comprising:

first driving means for driving the magnetic tape for fast winding and rewinding;

second driving means for driving the magnetic tape in a stepped manner;

detecting means for detecting the lead end of a selected one of said blocks by identifying said block address signals, said selected one block including a specific recording track on which the video signal information of a desired picture frame is recorded;

first control means responsive to said detecting means for operating said first driving means and stopping the same upon detection of the leading end of said selected one block, second control means responsive to said detecting means for operating said second driving means upon the detection of the leading end of said selected one block and stopping the same upon detection of said specific recording track; and third control means for operating a reproducing rotary magnetic head upon the detection of said specific recording track to achieve a still reproduction of the video signal information of said desired picture frame.

2. A device according to claim 1 wherein each of said block address signals includes a plurality of pulses recorded on said magnetic tape in a row in the driving direction of said tape and the leading end of each of said blocks is identified upon detection of at least a predetermined number of said pulses.

3. A device according to claim 1 wherein said blocks are disposed on the magnetic tape with a predetermined space between each adjacent two of said blocks.

4. A device according to claim 1 wherein each of said block address signals includes a specific low frequency component indicative of the leading end of said each block and the leading end of said each block is detected by means of a band-pass filter which is adaptable to detect said specific frequency component.

5. A device according to claim 1 wherein each of said block address signals includes a block identifying signal and a leading end indicating signal respectively recorded as different tracks spaced from the recording tracks of the video signal information.

* * * * *